(12) United States Patent
Kohn (10) Patent No.: US 7,047,784 B2
(45) Date of Patent: May 23, 2006

(54) HOT CUT ALUMINUM BILLET SAW

(75) Inventor: Thomas F. Kohn, Belding, MI (US)

(73) Assignee: Belco Industries, Inc., Belding, MI (US)

( * ) Notice: Subject to any disclaimer, the term of this patent is extended or adjusted under 35 U.S.C. 154(b) by 27 days.

(21) Appl. No.: 10/895,501

(22) Filed: Jul. 21, 2004

(65) Prior Publication Data

US 2005/0034502 A1    Feb. 17, 2005

Related U.S. Application Data

(60) Provisional application No. 60/494,618, filed on Aug. 12, 2003.

(51) Int. Cl.
    *B21C 23/00* (2006.01)
(52) U.S. Cl. .......................... 72/254; 72/270
(58) Field of Classification Search .................... 72/39, 72/41, 203, 253.1, 254, 255, 270, 324, 338, 72/364; 83/16, 171
    See application file for complete search history.

(56) References Cited

U.S. PATENT DOCUMENTS

| 2,815,562 A | 12/1957 | Wilkie et al. |
| 2,961,910 A | 11/1960 | Grassman |
| 3,069,950 A | 12/1962 | Hensley |
| 4,212,451 A * | 7/1980 | Klotzbucher et al. ......... 266/50 |
| 4,214,493 A | 7/1980 | Elhaus |
| 4,414,783 A | 11/1983 | Vincent |
| 4,440,054 A | 4/1984 | Elhaus |
| 4,554,851 A | 11/1985 | Elhaus |
| 4,574,672 A | 3/1986 | Ehm et al. |
| 5,109,740 A * | 5/1992 | Kohn et al. ..................... 83/15 |
| 5,678,466 A * | 10/1997 | Wahl ........................... 83/168 |
| 5,839,335 A | 11/1998 | Tilley |
| 6,467,278 B1 * | 10/2002 | Hu et al. ....................... 62/62 |
| 6,523,444 B1 | 2/2003 | Keller |

* cited by examiner

*Primary Examiner*—Ed Tolan
(74) *Attorney, Agent, or Firm*—John A. Waters; Varnum Riddering Schmidt Howlett LLP (57) ABSTRACT

A process and apparatus for extruding aluminum into products, wherein aluminum logs are first heated to a predetermined temperature in a furnace, then are cut into billets of predetermined lengths, and then the billets, while still hot, are extruded into predetermined products in an extruder. In the process, the logs are cut into billets with a cross cut circular saw immediately after the logs are heated and before the logs are permitted to cool to a temperature below a suitable extruding temperature. The circular saw is cooled and lubricated during the cutting to as to restrain the saw from sticking in the heated aluminum and so as to maintain the temperature of the log at the cut within a predetermined range wherein the aluminum is relatively easy to cut and waste is minimized.

6 Claims, 14 Drawing Sheets

HOT CUT ALUMINUM BILLET SAW

CROSS-REFERENCES TO RELATED APPLICATIONS

This is a non-provisional application based on and claiming the filing priority of provisional patent application Ser. No. 60/494,618, filed Aug. 12, 2003.

BACKGROUND OF THE INVENTION

In a conventional aluminum extrusion operation, aluminum stock in the form of large logs, perhaps 5 to 16 inches in diameter and up to 20–24 feet in length, are fed on a conveyor through an elongated furnace, where they are heated continuously to about 800–950° F. Then the logs are cut into short lengths called billets, which are fed immediately into an extruder, while the billets are hot. The extruder includes a ram that presses the billets through a die that forms the aluminum into extrusions of a desired shape. The extrusions can then be cut into desired lengths. Billets are cut to specific lengths, depending upon the particular part being extruded.

In a conventional aluminum extrusion operation, it is customary to change extrusion dies frequently. Each die requires a billet of a certain length. Thus, it is desirable to cut the logs into billets after they are heated and immediately before they are fed into the extrusion die, so that length can be adjusted as desired just before the billet is needed in the die.

The customary method that has been utilized in the aluminum industry for many years for cutting heated aluminum aluminum logs into billets has been a so-called hot shear, which is a pair of cutting dies that cut the aluminum into billets by a shearing action. One problem with this type of cutter is that a shear tends to compress the ends of the billet slightly by the clamping action of the shears. This gives the ends of the billet a non-circular shape with rounded edges, where the shears exert a clamping and cutting action on the log. This irregular shape can introduce bubbles in an extruded product and sometimes presents difficulties in extruding.

Notwithstanding these problems, the use of shears has been common practice for many many years.

Circular saws have been used to cut cold aluminum logs into billets prior to heating and to cut extrusions after formation. However, to date, circular saws have not been used successfully to cut thick hot aluminum logs into billets immediately after heating in a furnace and prior to extrusion. One reason for this is that hot aluminum has a sticky or gummy texture and would be expected to gum up and accumulate on a saw blade. Also, it would be expected that it would be damaging to saw equipment to position it adjacent the open end of a 1000° F. furnace.

An object of the present invention is to provide an improved method and apparatus for cutting hot aluminum logs into billets for an extruding operation.

SUMMARY OF THE INVENTION

In accordance with the present invention, heated aluminum logs are cut into billets by means of a cross-cut circular saw, after the logs are heated to 800–950° F. in a billet heating furnace and prior to the billets being fed to an extrusion machine. An important feature of the present invention is that the saw is simultaneously cooled and lubricated. The cooling reduces the cutting temperature at the kerf in the log, while the machine lubricant reduces the friction between the blade and the sticky hot aluminum. The combination of the temperature reduction and lubricant makes it possible to cut hot, sticky aluminum with a saw, without leaving an aluminum build up on the saw. In addition, the use of a saw under elevated temperature conditions produces a fine, powdered cut, producing less scrap than a cold cut saw and requiring substantially less horsepower than a cold cut saw. Blade life also is improved.

These and other features, objects, and benefits of the invention will be recognized by one having ordinary skill in the art and by those who practice the invention, from the specification, the claims, and the drawing figures.

DETAILED DESCRIPTION OF PREFERRED EMBODIMENT

Figure 1:
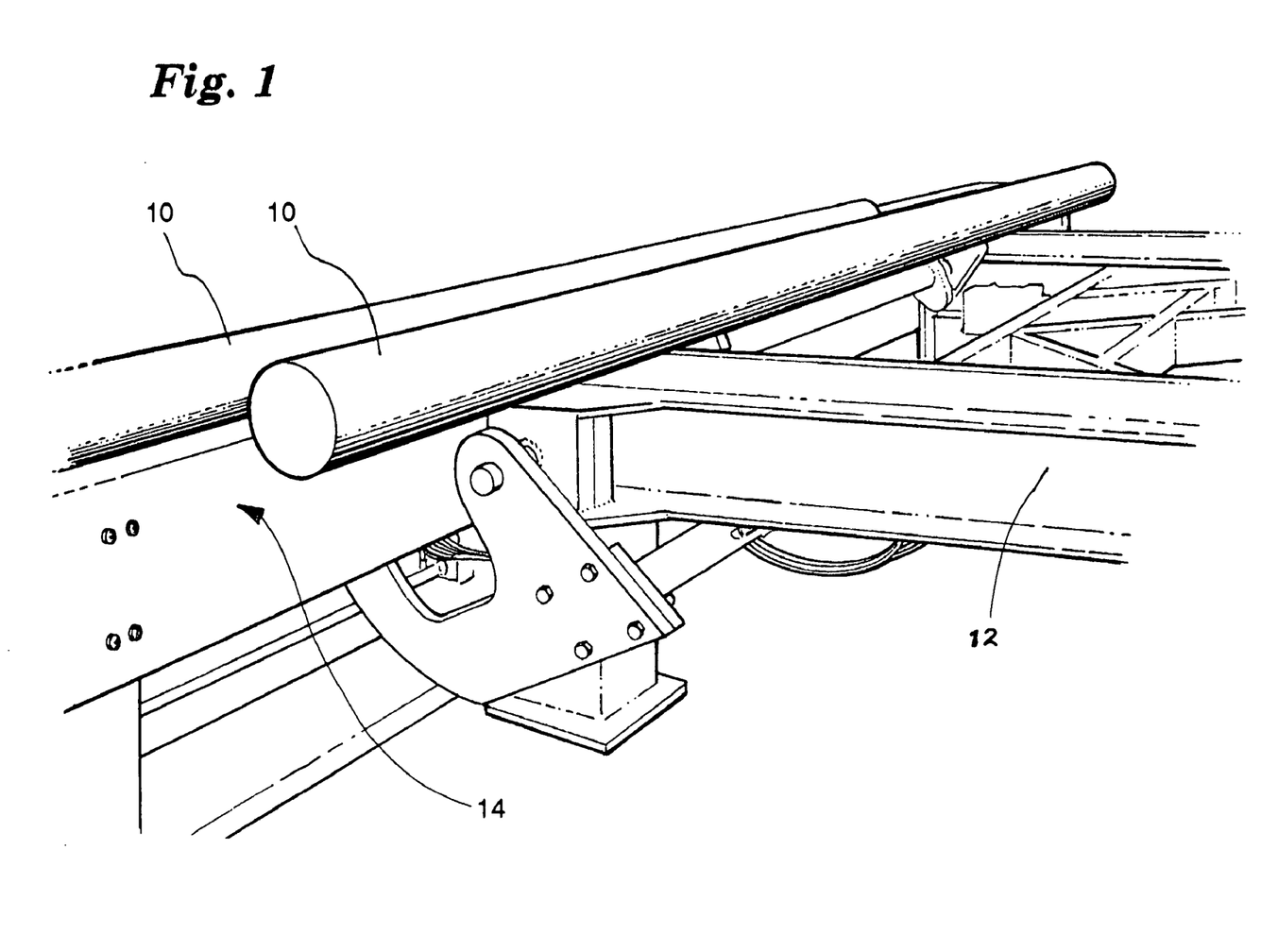
FIG. 1 is a perspective view showing aluminum logs positioned upstream of an inlet of an aluminum heating furnace.
Figure 2:
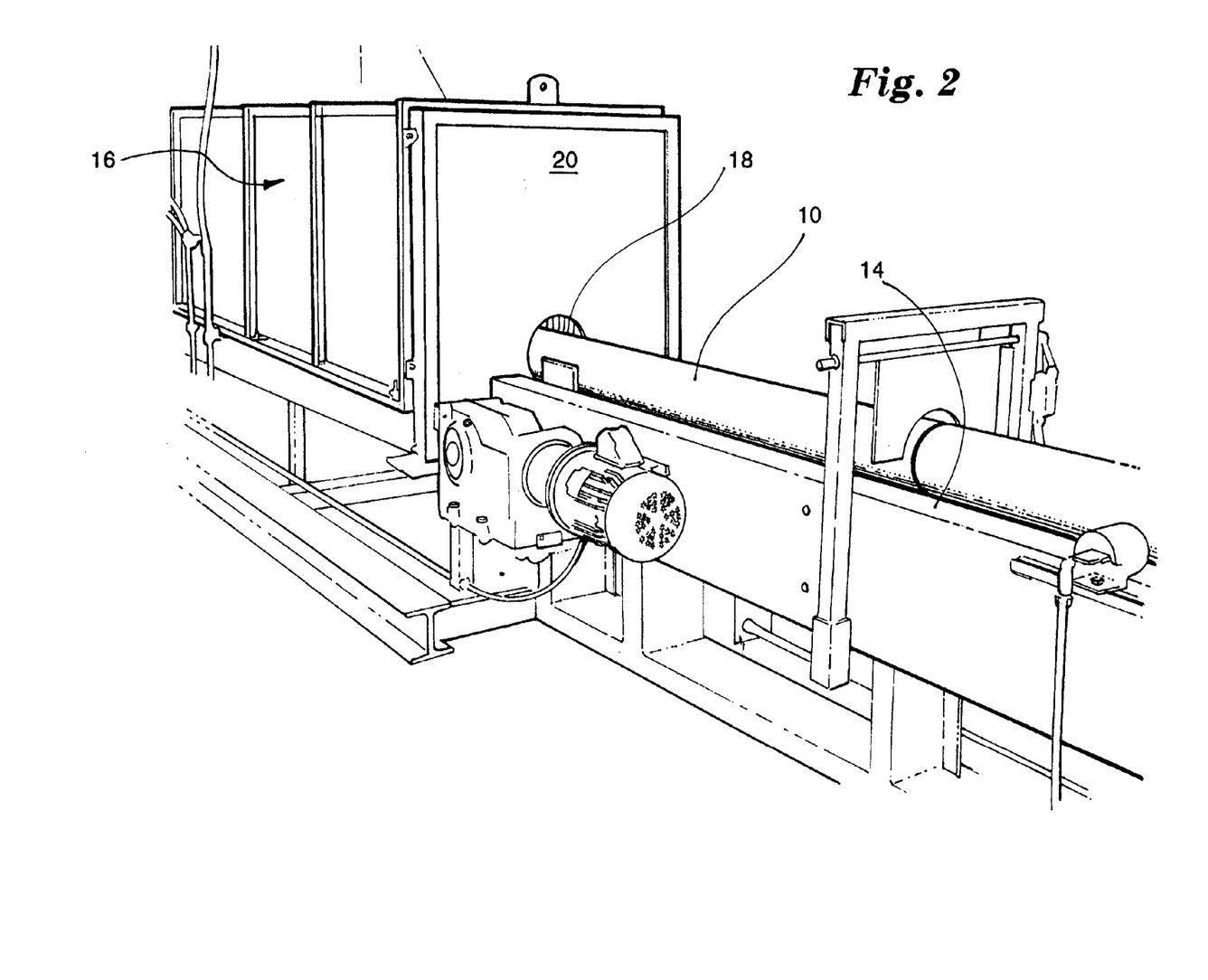
FIG. 2 is a perspective view showing a series of aluminum logs being fed on a horizontal conveyor into the inlet of a continuous aluminum heating furnace.
Figure 3:
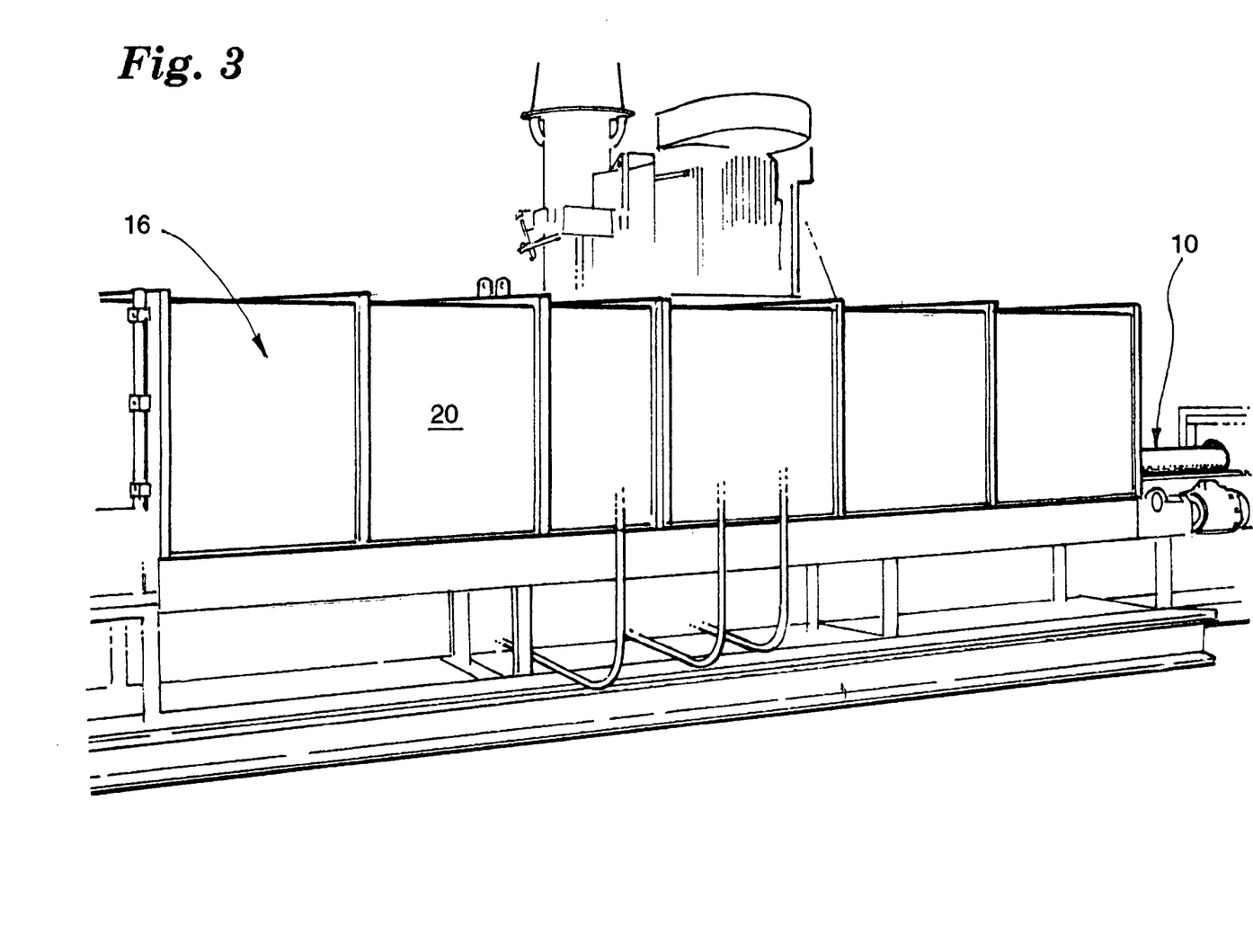
FIG. 3 is a perspective view of the side of an aluminum furnace.
Figure 4:
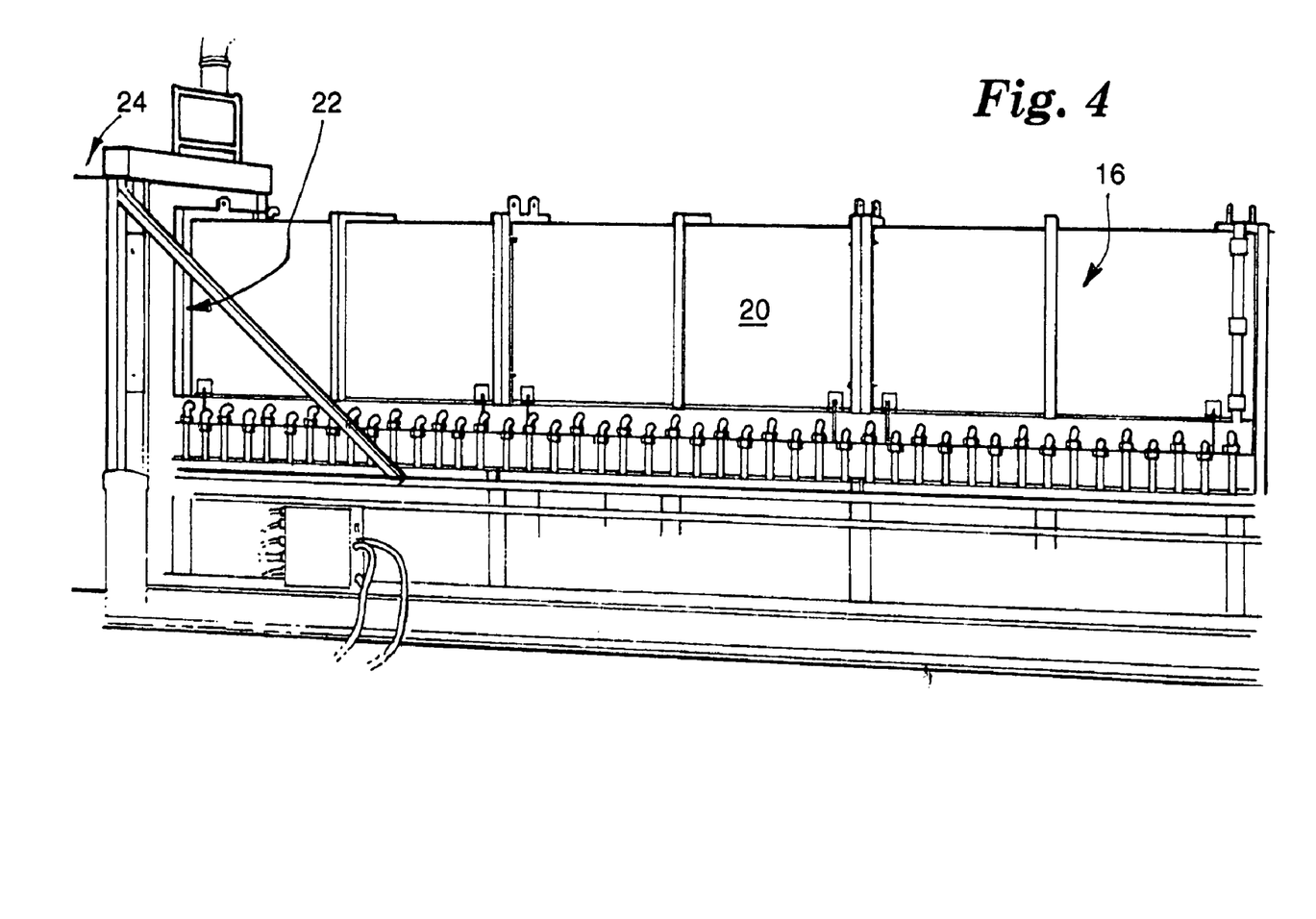
FIG. 4 is a perspective view of the aluminum furnace, showing the end of the furnace.

Referring to the drawings, a plurality of aluminum logs 10, typically about 5 to 16 inches in diameter and up to 20–24 feet in length, are positioned on a rack 12 leading to a horizontal roller conveyor 14, which extends through a furnace 16 (FIG. 2) of conventional design. Logs 10 enter the furnace in end to end alignment through an opening 18 in the upstream end of the furnace. The furnace is covered by an enclosure 20. The logs are heated in the furnace as they extend along the length thereof until they reach a downstream or outlet end 22. In the furnace, the aluminum logs are heated to a temperature of 800–950° F. In aluminum forming operations, it is important to heat the aluminum to a proper temperature. Aluminum melts at about 1220° F. and has a fairly narrow range of increased malleability below the melting point of the material. It is desirable to maintain the aluminum at a temperature at which it will not melt, even when the aluminum is caused to be heated further by cutting or by the compression of an aluminum ram in an extruding process.

Figure 5:
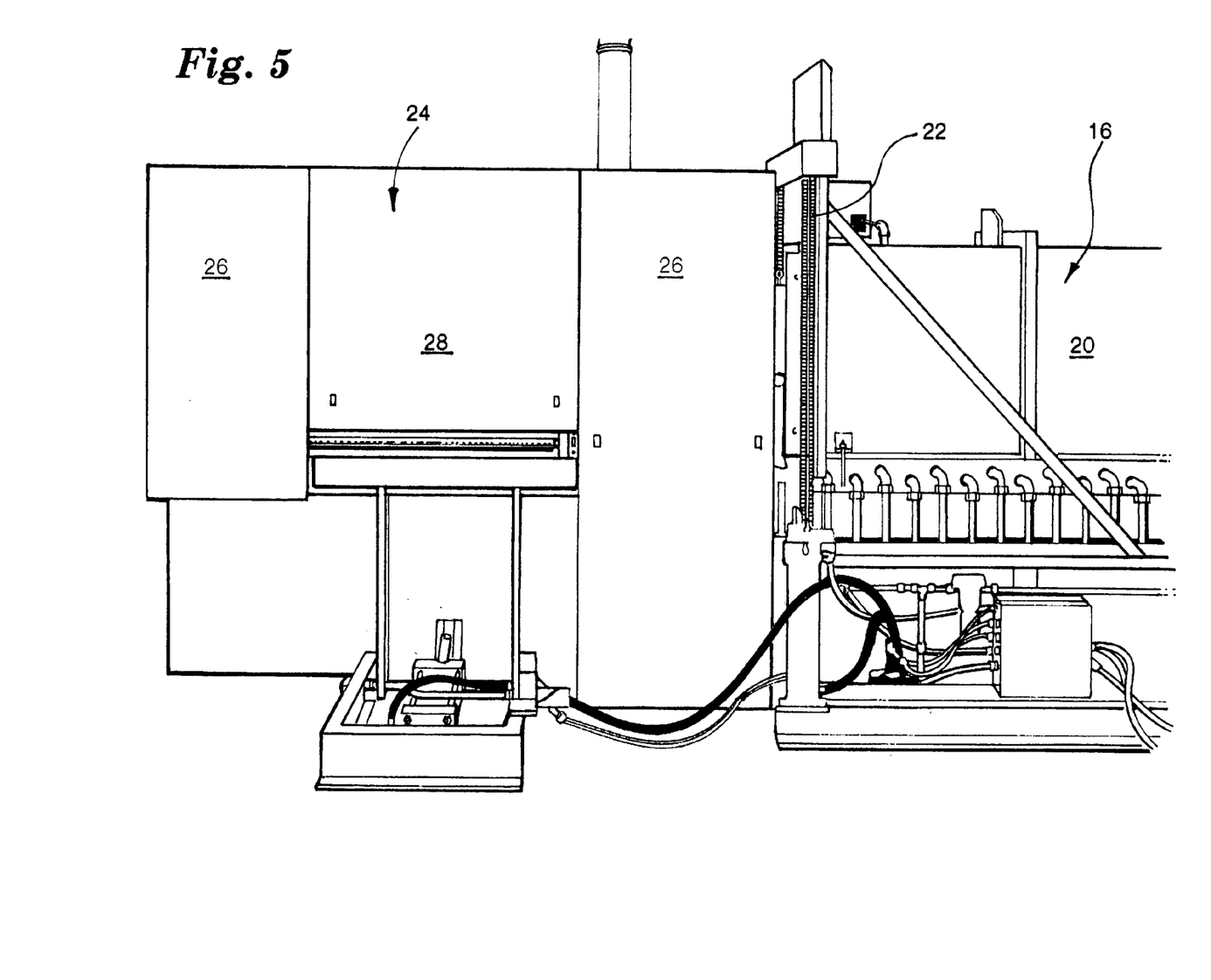
FIG. 5 is a perspective view showing the cutoff apparatus of the present invention positioned at the end of the aluminum furnace.
Figure 8:
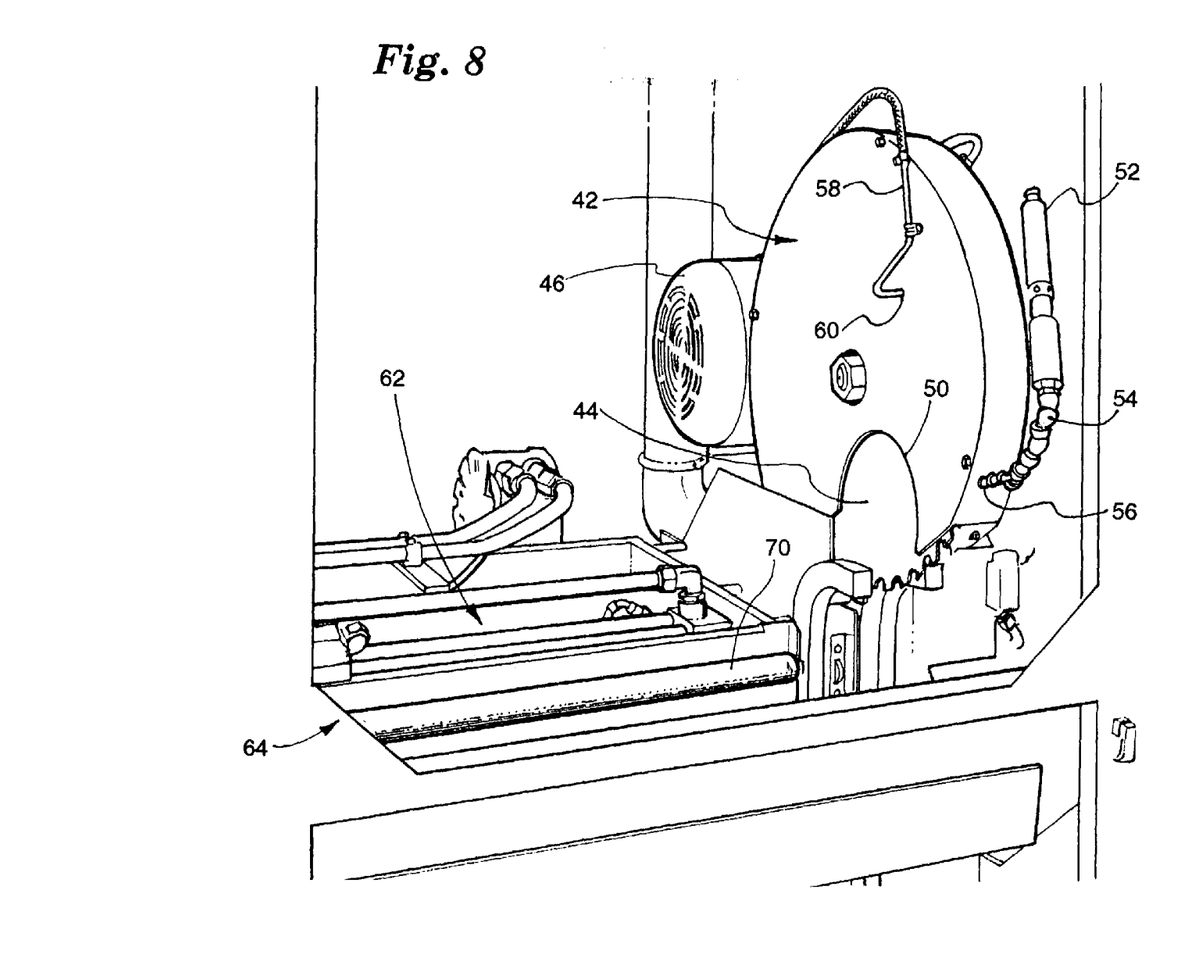
FIG. 8 is a perspective view of the billet cutting apparatus at the end of the furnace, with the door being opened to show the cutoff saw and other components therein.

Referring again to the drawings, a billet cutting apparatus 24 is positioned at the downstream end 22 of the furnace in position to receive the aluminum logs immediately after they are heated. Billet cutting apparatus 24 includes a housing 26 (preferably stainless steel) having an open interior that is accessed by a sliding door 28 in the side of the housing. The housing helps to shield the saw equipment from the heat of the furnace. In the illustration, only the furnace and billet cutting apparatus are depicted. In operation, the billet cutting apparatus would be adjacent a conventional extruding mechanism, wherein billets formed in the cutting apparatus could be immediately transferred through the sliding door (or otherwise as an application may require) to the inlet of an extruder, wherein the still heated aluminum is pressed through a die by a ram.

Figure 6:
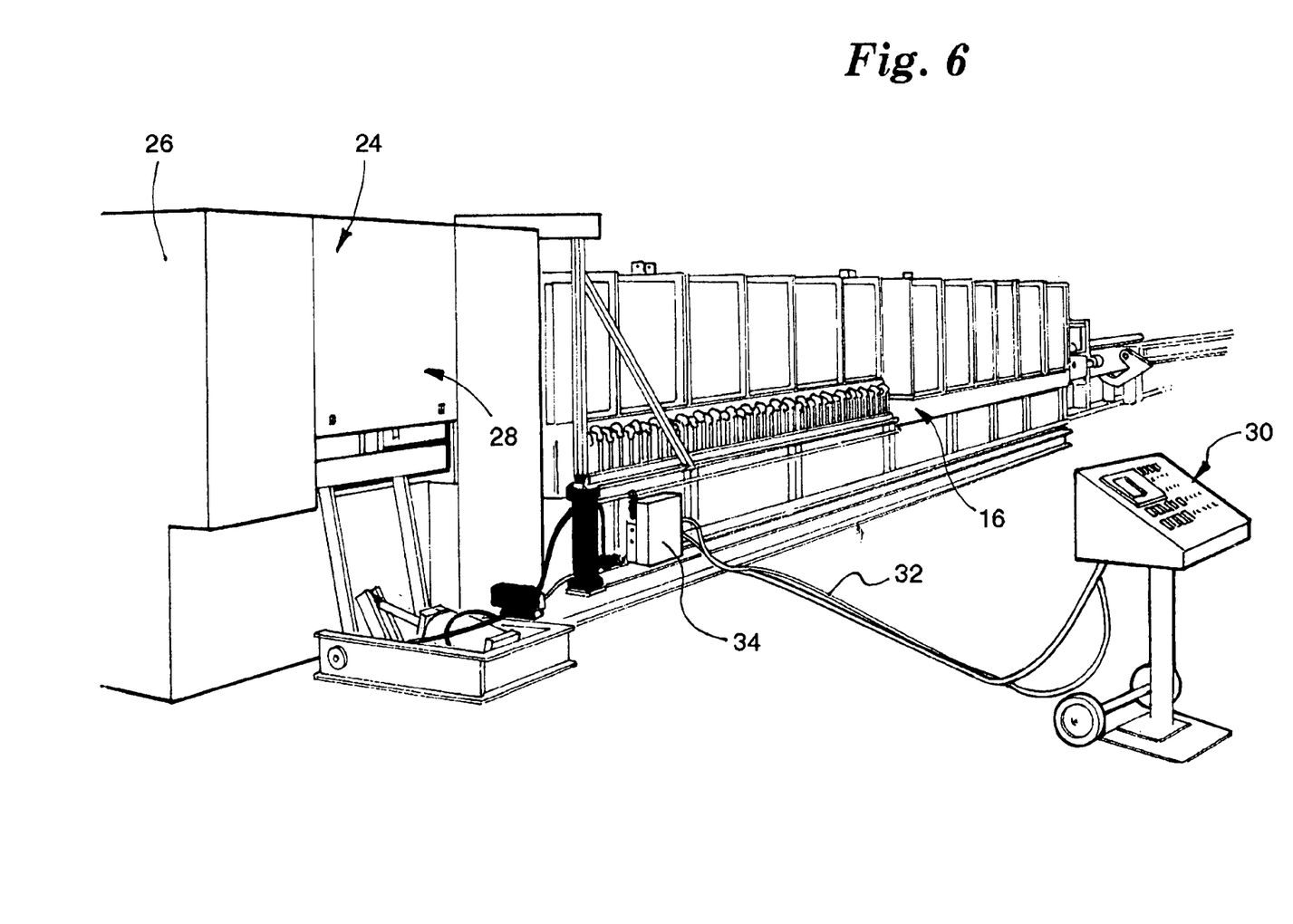
FIG. 6 is a perspective view showing the whole furnace heating and cutoff line.
Figure 7:
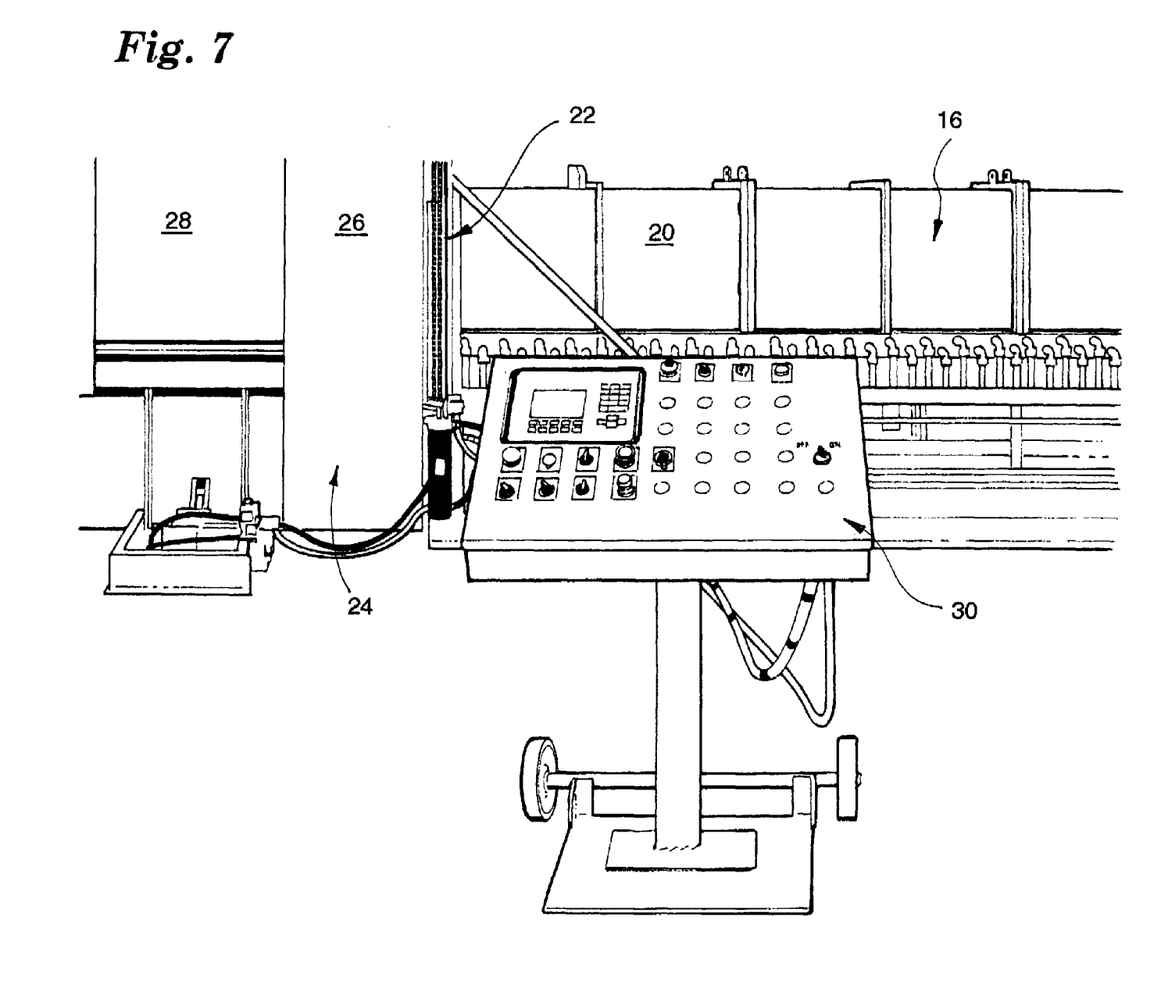
FIG. 7 is a perspective view showing the control panel in position to monitor and control the various aspects of the furnace and cutoff operation.

As shown in FIGS. 6 and 7, the various aspects of the operation of the furnace and cutoff apparatus are controlled by an electrical control panel 30 connected by control cables 32 to control devices 34 that control various aspects of the operation, such as temperature and speed and the operation of the cutoff apparatus to form billets of a desired size.

Figure 9:
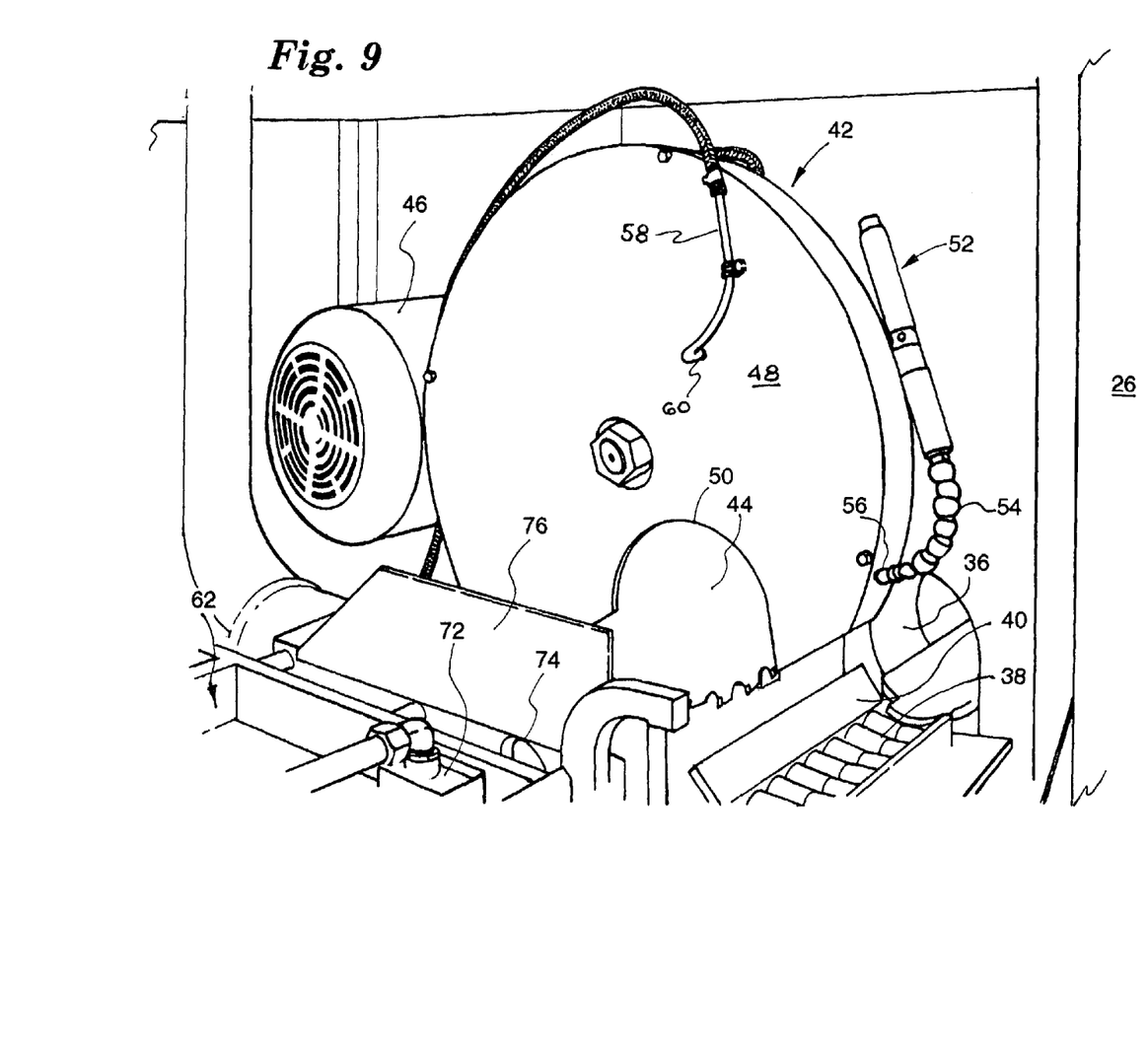
FIG. 9 is an enlarged view of the cutoff saw of FIG. 8.

The interior of the billet cutting apparatus housing is shown in FIGS. 8–14. A furnace outlet 36 is shown in FIG. 9. Heated billets are conveyed longitudinally through the outlet to billet conveyor 38 in the interior of the billet cutting housing. The billet conveyor has an inclined side 40, and the rollers are concave, so that billets are urged to a centered position on the conveyor.

Figure 10:
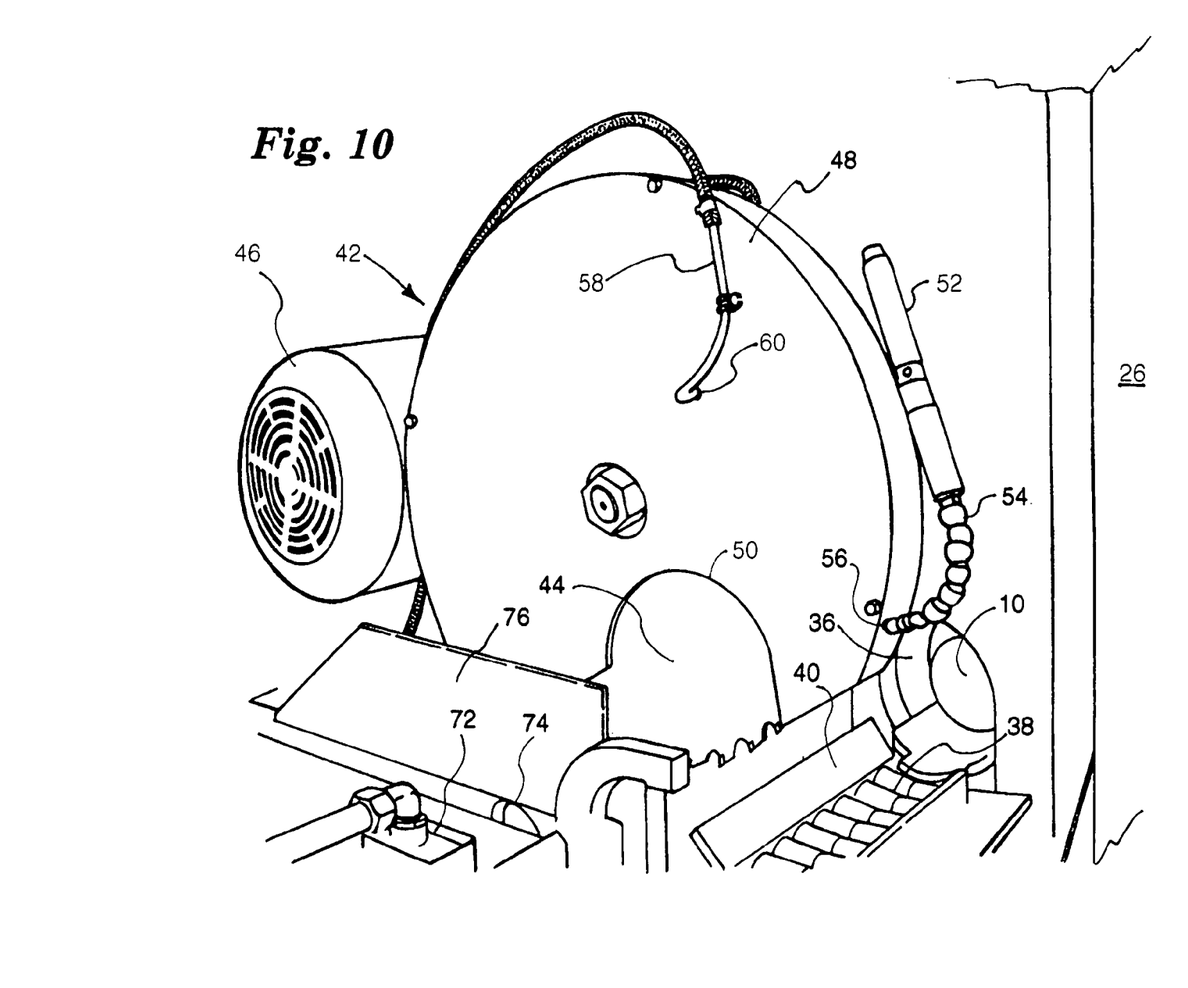
FIG. 10 is another perspective view of the cutoff saw of FIG. 9.
Figure 14:
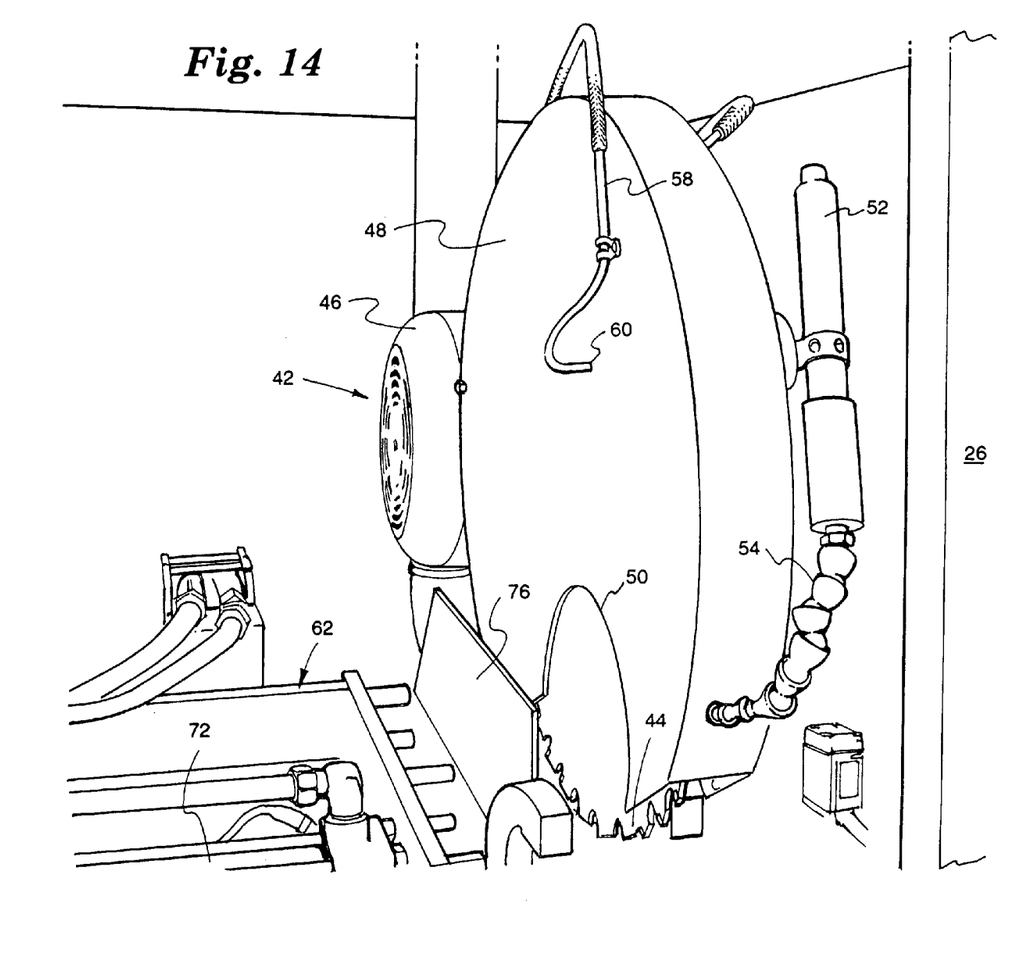
FIG. 14 is a perspective view of the cutoff saw of the present invention.

A circular cutoff saw 42 is positioned adjacent outlet 36, in position to cut the aluminum logs into billets immediately after they leave the furnace in a heated condition. Cutoff saw 42 includes a rotating radial saw blade 44 powered by a motor 46 and enclosed by a housing 48. The housing has an opening 50 where a peripheral edge of the saw is exposed for purposes of engaging and cutting the aluminum logs into billets. The saw can employ a 26 inch diameter circular saw blade having 42 teeth with one quarter inch wide carbide tips. A rake angle of about 0° has been shown to be effective. A rake angle of about 10° or less is desired. The saw typically operates at about 1975 RPM.

A feature of the present invention is that the cutting edge of the saw blade is lubricated and cooled while it is cutting the heated aluminum logs. Cooling is accomplished by cooling apparatus 52 that provides a cold fluid through a conduit 54 to an outlet 56 in the edge of the housing immediately upstream of the opening 50 in the housing where the blade engages the log to cut it into billets. Thus, the cooling fluid cools the blade immediately before it contacts the heated aluminum billet. Desirably, the cooling apparatus comprises a conventional air cooler called an Excess Air Vortec Cooler. This is a conventional device that generates cold air of about 6–8° F., which is adequate for the preferred saw of the present invention. The cold air is directed against the tooth area at the outer periphery of the blade. Without the cooler, the blade temperature tends to increase more as a result of contact with the heated billet and the friction of the blade against the billet. In addition, the cooler tends to cool the interior of the enclosure for the saw apparatus, reducing the potential for heat damage to motors and bearings and other saw components. Without the cooler and lubrication, the heated aluminum can become gummy, thereby impairing the blade operation. With the blade temperature reduced in this manner, the cutting efficiency remains quite high and the blade cuts the aluminum efficiently without gummy buildup. Instead, the cutting byproduct at elevated temperatures is a fine powder, which is much finer than the course chips produced in a cold cutting operation. There appears to be substantially less waste with the hot cutting operation of the present invention than with a cold cutting aluminum saw. Other fluid coolants, such as liquid nitrogen, can be used but they are more expensive.

In addition to the cooling of the blade, it is important that the blade be adequately lubricated with a conventional blade lubricating fluid. The liquid lubricant in this case augments significantly the hot cutting capabilities of the saw. The lubricant in the present invention is provided through a lubricant hose 58 to an outlet nozzle 60 that extends through a side of the housing and is directed on the side of the blade. A lubricant reduces friction and therefore also prevents the sticky, hot aluminum from building up on the blade.

An advantage with the saw of the present invention is that the saw cuts cleanly through the aluminum log, minimizing waste and producing a round cross section at the cut and not deforming the aluminum log where the cut has formed. Thus, the billets are accurately formed and fit properly into an aluminum extruding apparatus with no rounded or non-circular surfaces to produce bubbles because of air entrapment in the extrusions and otherwise impair the quality of the final extrusions.

Figure 11:
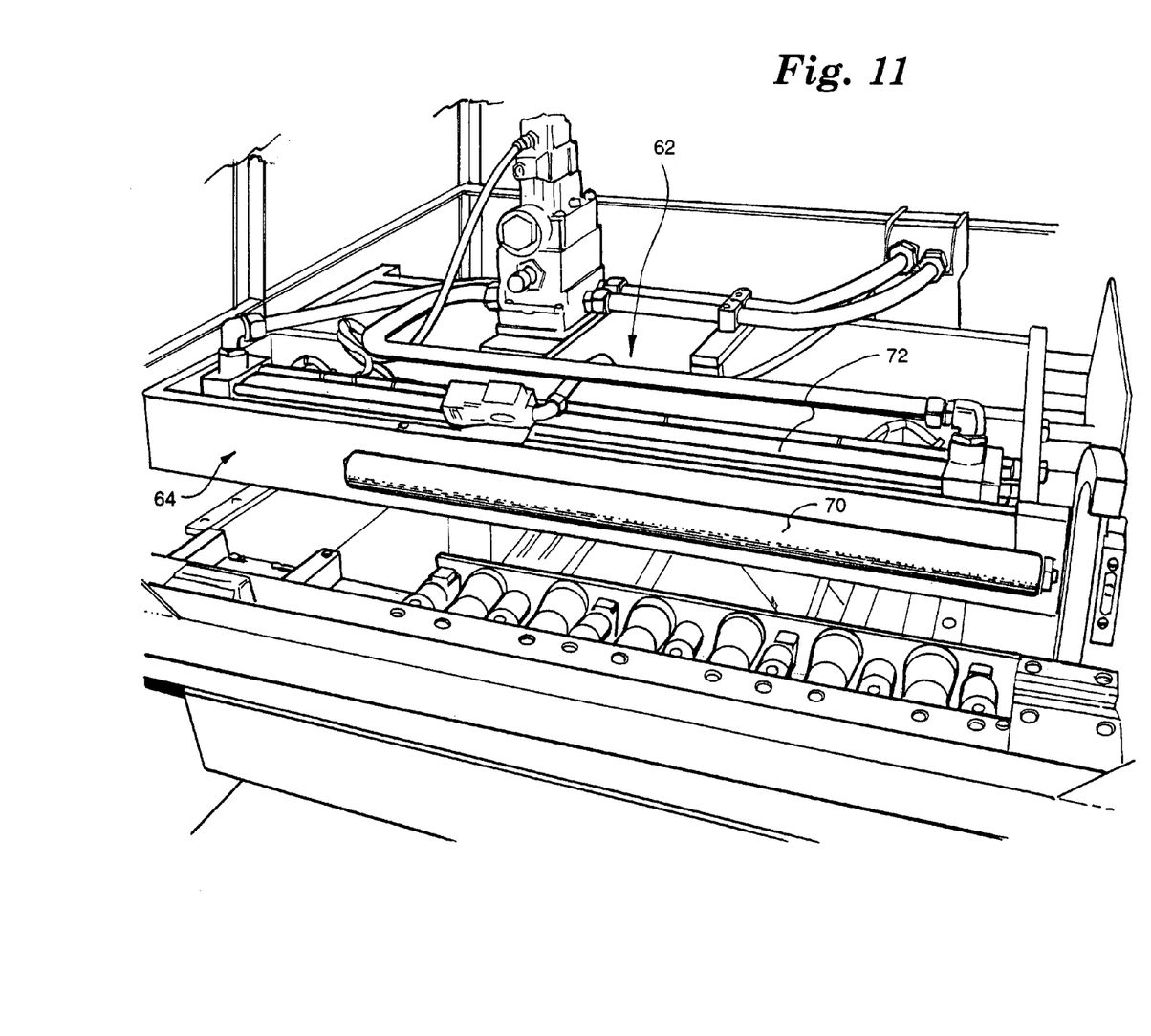
FIG. 11 is a perspective view of a billet discharge mechanism positioned in a retracted position.
Figure 12:
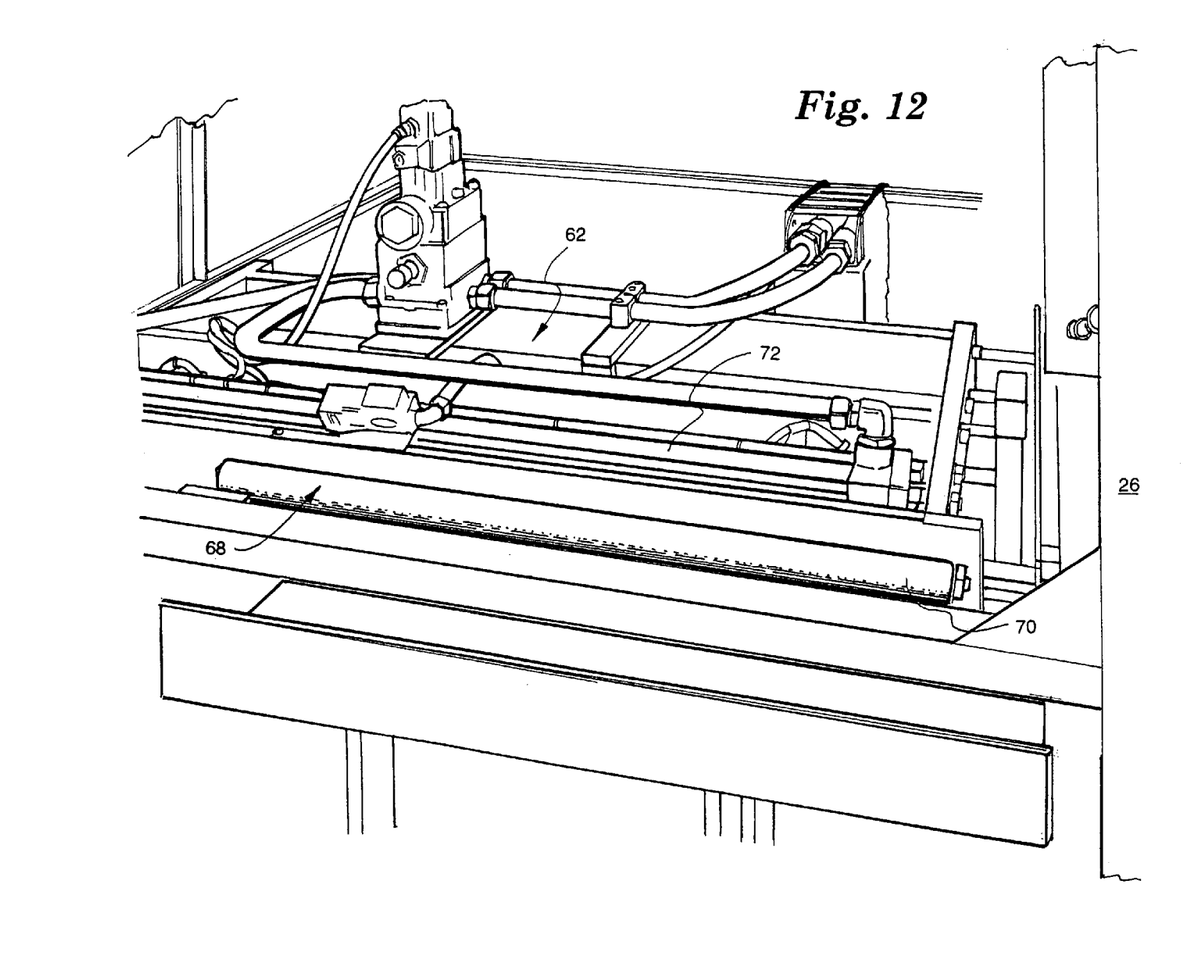
FIG. 12 is a perspective view of the billet discharge mechanism of FIG. 11 in an extended position.
Figure 13:
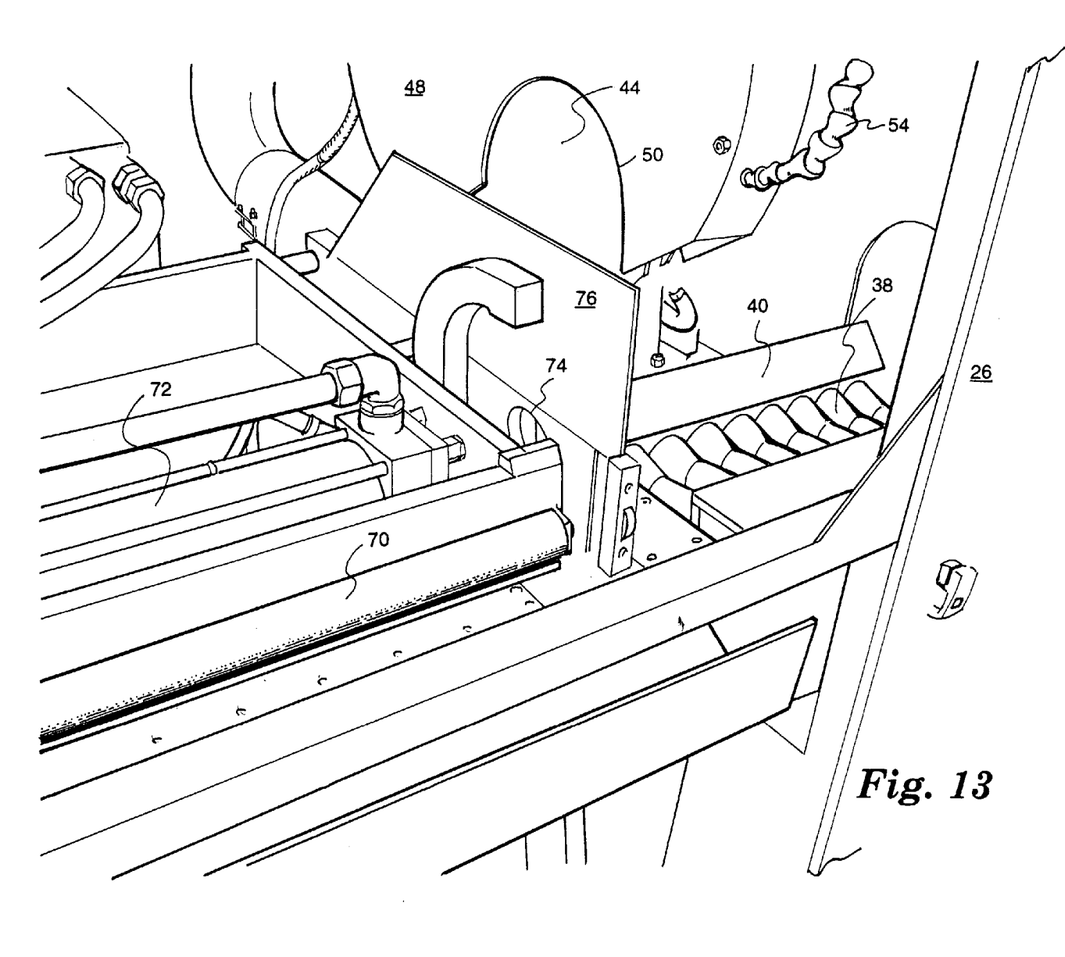
FIG. 13 is a perspective view of the billet discharge mechanism in its extended position, as shown in FIG. 12.

The components of the billet cutoff apparatus downstream of the saw are disclosed in FIGS. 11–13. After a billet has been cut, it is positioned adjacent an open side of the billet cutoff apparatus. A billet side discharge ram 62 positioned adjacent the cut billet is thereafter reciprocated from a retracted position 64 (shown in FIG. 11) to an extended position 68 (shown in FIGS. 12 and 13). In moving from the retracted positioned to the extended position, bar 70 on the ram engages the side of the billet and discharges it in a sideways direction from the billet cutoff housing. Thereafter, the billet is conveyed in a conventional manner directly into an extruding apparatus. It should be noted that the billet can be conveyed in any of a number of ways to an extruding operation, as dictated by the requirements of the particular extruding operation.

When the billet side discharge ram extends to discharge a billet from the side of the billet cutoff housing, a hydraulic log retracting cylinder 72 is moved into alignment with the end of the portion of the log that is upstream of the cut billet. This cylinder has an extendable output shaft that is aligned with an opening 74 in a plate 76 that moves along with the billet side discharge ram into downstream abutment with the uncut portion of the log. The output shaft of the ram is then extended through opening 74, where it engages the end of the log and pushes it upstream back into the furnace, where it remains and is reheated to furnace outlet temperature. When the log is to be cut into the next billet, the ram is retracted, and the side discharge ram is retracted so that the log can move outwardly into position to be cut into the next billet. With this apparatus, the log does not cool off to an undesirably low temperature before the next billet is cut.

With the use of a cutoff saw of the type employed in the present invention, billets are formed in a proper shape, without deformation by the cutoff equipment, and waste is minimized. These and other advantages of the present invention will appear to the person skilled in the art.

It should be understood that various changes and modifications may be made in the arrangements and details of construction of the embodiments disclosed herein without departing from the spirit and scope of the present invention.

I claim:

1. A process for extruding aluminum into products, wherein aluminum logs are first heated to a predetermined temperature in a furnace, then are cut into billets of predetermined lengths, and then the billets, while still hot, are extruded into predetermined products in an extruder, the improvement wherein the logs are cut into billets with a cross cut circular saw immediately after the logs are heated and before the logs are permitted to cool to a temperature below a suitable extruding temperature, the circular saw being cooled and lubricated during cutting so as to restrain the saw from sticking in the heated aluminum and so as to maintain the temperature of the log at the cut within a predetermined range wherein the aluminum is relatively easy to cut and waste is minimized.

2. A process as in claim 1 wherein the saw is cooled by an air cooler that provides cooled air against the face of the saw blade upstream of the cut in the log.

3. A process as in claim 2 wherein the air is cooled to about 6–8° F. or cooler.

4. A process as in claim 1 wherein the saw is positioned in an enclosure that shields the saw from heat from the furnace, the saw being cooled with a gaseous coolant that is introduced inside the enclosure so as to cool bearings for the rotating saw as well as the saw blade.

5. In a process for extruding aluminum wherein aluminum stock is provided in the form of elongated logs, the process comprising:

transporting the logs in longitudinal alignment through a furnace on a conveyor, wherein the logs are hated to an extruding temperature below the melting point of the aluminum logs;

cutting the heated logs into billets of selected lengths after the logs have been heated in the furnace and before they are conveyed to an extruder, the cutting being accomplished with a circular cross cut saw positioned immediately downstream of the furnace, the saw being transversely movable to cut the log into billets;

continuously cooling the saw blade so as to prevent the saw blade from overheating and so as to cool the cut in the log to a temperature below where the log melts or becomes so sticky that it produces substantial drag on the saw blade;

lubricating the saw blade as it rotates so as to minimize friction between the saw blade and the cut in the log; and delivering the heated and cut billets directly to an extruder for producing extruded products of a predetermined design and size.

6. Apparatus for supplying heated aluminum billets to an aluminum extruder comprising:

an elongated furnace having a conveyor running through it, the conveyor conveying elongated aluminum logs through the furnace from a furnace inlet to a furnace outlet, the furnace heating the logs to a temperature of about 800 to 950° F. and discharging the logs from the furnace outlet;

a billet cut off saw positioned at the furnace outlet for cutting the heated logs into billets of predetermined length, the billet saw comprising a circular saw blade positioned transversely to a longitudinal orientation of the heated logs, the saw being relatively movable transversely with respect to the logs such that the saw can cut the logs into billets as they pass by the saw;

a blade cooler positioned adjacent the saw to reduce the temperature of the saw blade as it cuts the hot logs, the cooler reducing the temperature of the blade and the blade in turn reducing the temperature of the log at the kerf formed by the saw blade, the reduction in temperature being sufficient to prevent the log from melting and to maintain the log at a desirable cutting temperature wherein the log is easier to cut than an unheated log or a log that is heated to the point where it is gummy; and a lubricant applicator positioned adjacent the saw blade, the lubricant applicator dispensing a lubricant on the saw blade so as to reduce the friction of the saw blade in the log.

\* \* \* \* \*